July 11, 1967  F. PRADENAS  3,330,035
ELECTRICALLY HEATABLE PANELS AND METHOD OF MAKING THE SAME
Filed March 20, 1963  4 Sheets-Sheet 2
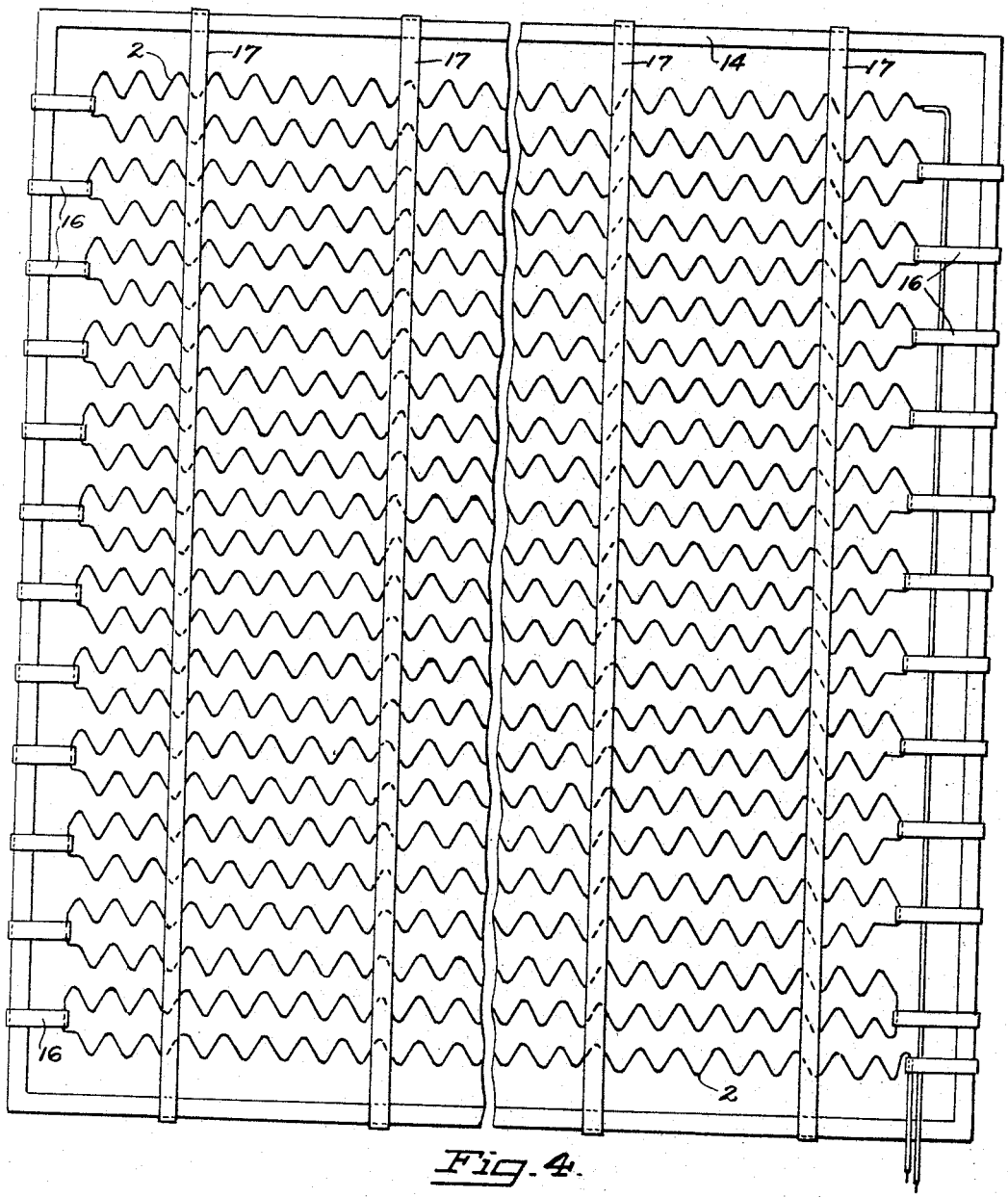
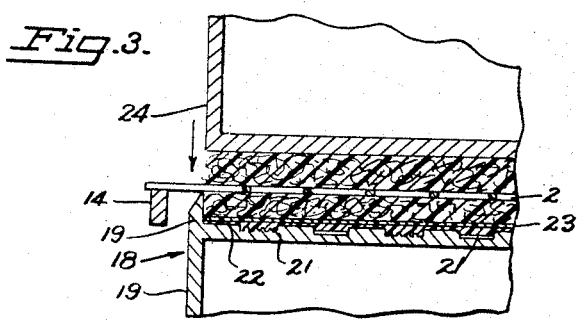
INVENTOR.
FERNANDO PRADENAS
BY George B. White
ATTORNEY July 11, 1967  F. PRADENAS  3,330,035
ELECTRICALLY HEATABLE PANELS AND METHOD OF MAKING THE SAME
Filed March 20, 1963  4 Sheets-Sheet 3

INVENTOR.
FERNANDO PRADENAS
BY George B. White
ATTORNEY

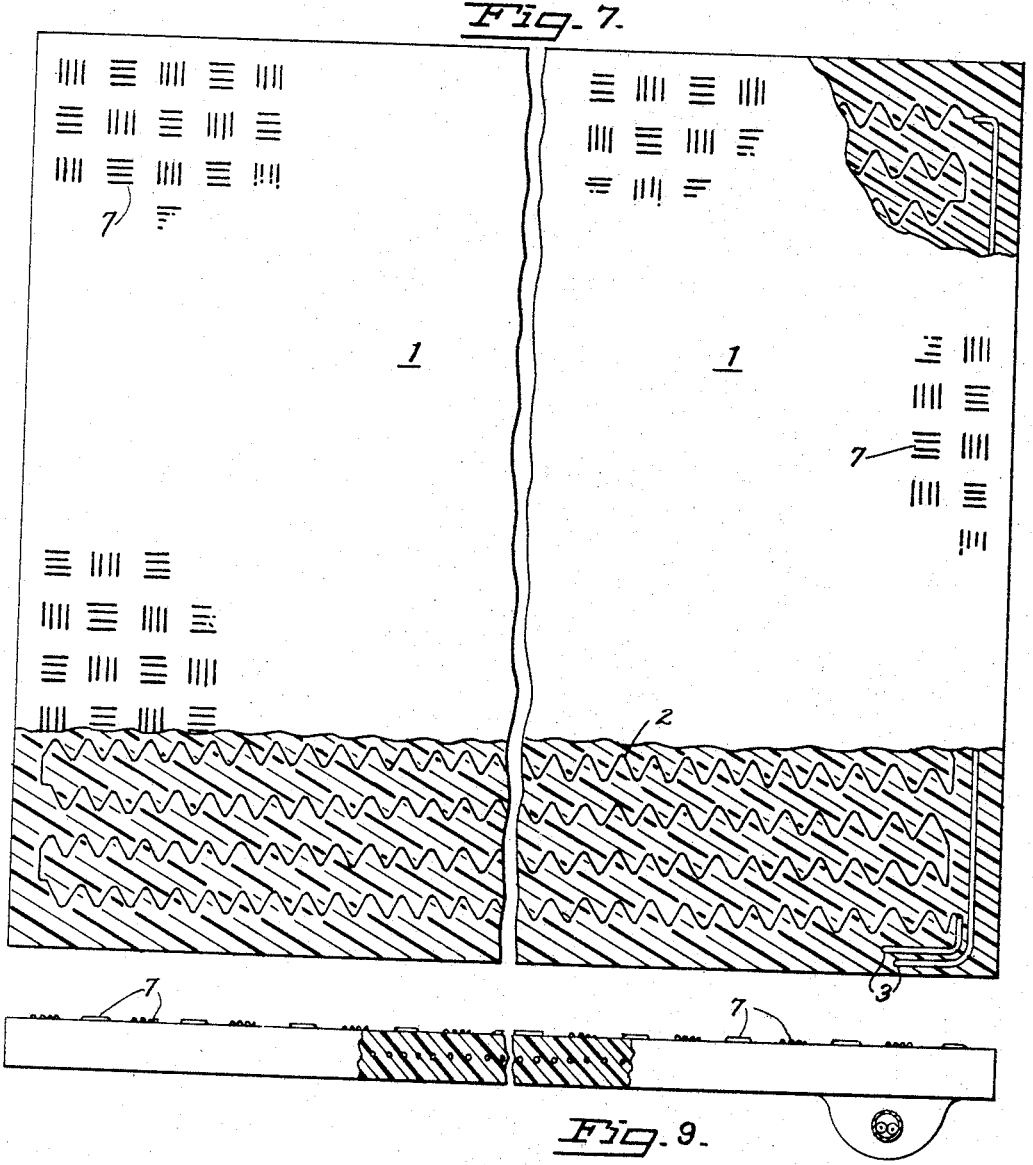
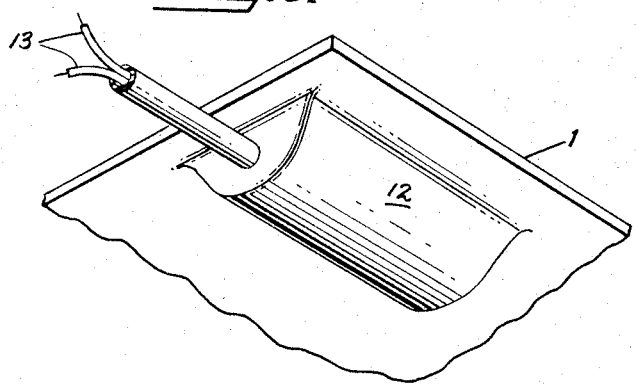
INVENTOR.
FERNANDO PRADENAS
BY George B. White
ATTORNEY

United States Patent Office 3,330,035
Patented July 11, 1967

3,330,035
ELECTRICALLY HEATABLE PANELS AND METHOD OF MAKING THE SAME
Fernando Pradenas, San Anselmo, Calif., assignor to H. Koch & Sons, Corte Madera, Calif., a corporation of California
Filed Mar. 20, 1963, Ser. No. 266,570
5 Claims. (Cl. 29—611)

This invention relates to electrically heatable panels and method of making the same.

The primary object of this invention is to provide a panel which can be used on various surfaces, for instance for floors or walks, or drive-ways, and which are adapted to uniformly heat a large surface. When such panel is used where its surface will be exposed to foot and wheel traffic, then the wearing surface of the panel is provided with integral protruding non-skid projections which are made specially high resistant to wear. When used where the exposed surface of the panel will not be subjected to direct abrasive use, then the exposed surface of the panel is provided with a smooth surface suitable for example for walls or ceilings, roofs and the like. In each instance the exposed surface is treated to become highly resistant to wear and weather and other deteriorating influences, yet the panel provides in all applications for the transmission of uniform heat throughout its entire surface.

Another object of the invention is to provide a panel with an embedded heating element integrated with laminations from which the panel is made, the terminal ends of the heating element in the panel being extended so that when such panels are placed side by side to cover a given surface the terminals of the heating elements of the panels extend generally in the same direction and can be used in connection with an electric conduit provided along a side of the series of panels having suitable outlets or receptacles into which the terminals can be plugged or otherwise connected.

Another object of the invention is to provide a panel made out of laminations integrated together with a heating element sandwiched between the laminations of the panel so that the heating element becomes a permanent part of the laminate after suitable integration; and wherein the heating element is so formed that it extends over the entire area of the panel so as to uniformly heat the entire panel surface; in the present illustration such heating element being a suitable resistance wire conductor formed into a generally sinusoidal shape and then bent upon itself back and forth the full length of the panel and over the entire width of the panel so as to form a continuous heating element.

Another object of the invention is to form a laminate panel with the continuous heating element sandwiched integrally in layers of fiberglass united with suitable resin into an integral firm panel of sufficient rigidity to form a solid surface, the heating element being formed in sinusoidal shape and is bent in such a manner as to enable it to contract and expand with the laminate and also to permit it to flex in the event the comparatively thin laminate may be bent; and which panel has substantial tensile and flexural strength.

Another object of the invention is to provide a method for making a heatable laminate panel by forming the heating element out of a strong resistance wire conductor in sinusoidal shape spread over the entire area corresponding to the area of the panel, then laying the heating element on a layer of fiberglass and covering it with another layer of fiberglass, then adding resin to the fiberglass layers and curing the laminates together into an integral unit; additional steps of the method are the introducing in a mold for forming such a panel a special plastic of high wear resistance and weather resistance over the surface of the mold which ultimately would form the exposed surface of the panel so as to integrate such coating with the laminates during curing.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 3 is a fragmental sectional view of the layers of the panel in the mold.

FIG. 4 is a fragmental plan view of the forming and mounting of the heating wire of my heatable panel.

FIG. 7 is a fragmental partly sectional top view of a panel.

FIG. 8 is a fragmental perspective view of a corner of the bottom face of the panel showing the covered joint for the outlet wires.

FIG. 9 is a fragmental partly cross-sectional view of the finished panel.

Figure 1:
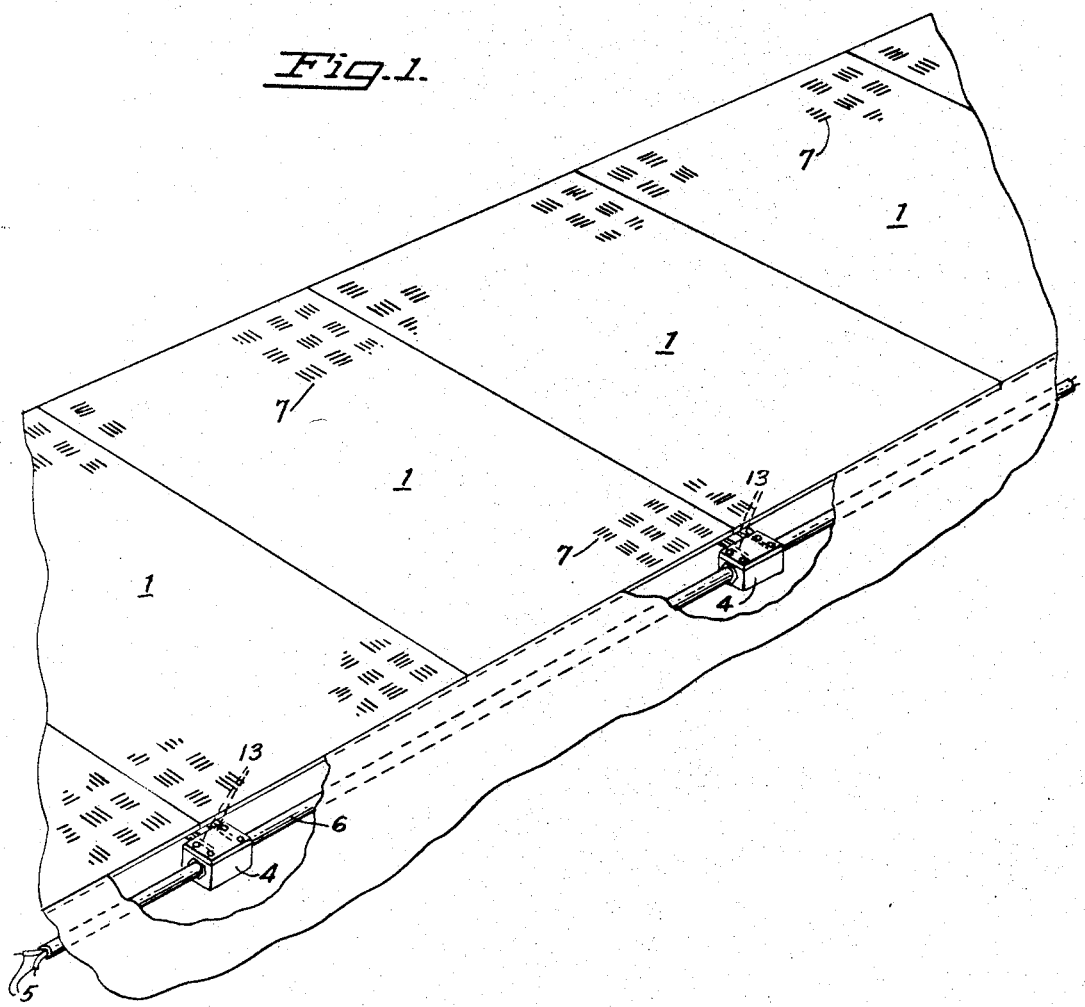
FIG. 1 is a perspective view of a driveway or walk constructed in accordance with my invention.

The heatable panel of this invention can be molded in various shapes and thicknesses suitable for various uses. In the present illustration the panel 1 is made comparatively thin and it is made of fiberglass reinforced plastic with a heating wire 2 embedded and integrated in the fiberglass reinforced plastic laminates. Terminals 3 extending from one end of each panel as shown in FIG. 1 are connected in suitable junction boxes 4 to electric wires 5 in a conduit 6 along the side of the walk or surface covered by the series of panels 1.

In FIG. 1 the panels are arranged for use as a cover for a driveway. These panels, therefore, are provided with suitable wearing projections 7 and a toughened wearing surface as hereinafter described.

The heating wires 2 are formed to produce uniform heat throughout each panel. Therefore, such cover would be eminently adapted to keep walks and driveways clear of snow or ice, or generally to warm the surrounding air.

Figure 2:
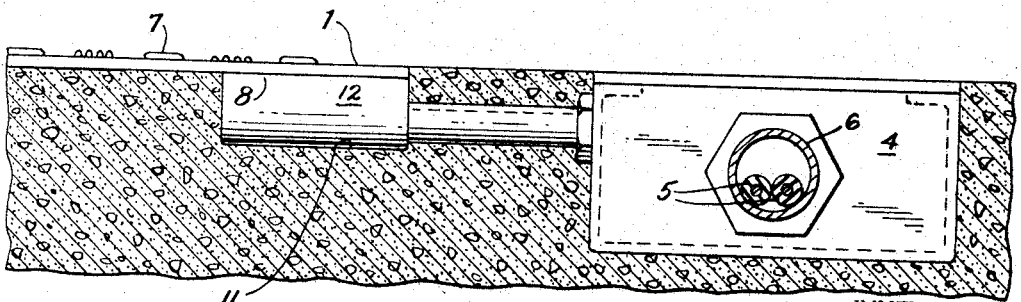
FIG. 2 is a fragmental sectional view of the driveway at one of the joint boxes.

As shown in FIG. 2 the panels are secured by a suitable plastic adhesive layer 8 on the top of the usual surface of the concrete walk or driveway. A suitable cavity 11 is formed in the driveway to accommodate a junction 12 at a corner of the panel 1 to accommodate the panel leads 13 from the heating element 2 to the junction box 4.

Each panel 1 is made out of several laminates of the fiberglass layers between which is sandwiched the heating element 2, which layers are suitably saturated with resin to form in the present illustration a pressure laminated glass fiber base polyester thermosetting resin.

In the method of making such a panel the conductor is first formed out of Nichrome wire of comparatively high strength and in such a shape as to be best for uniform heating and high mechanical strength. The size and length of the wire are predetermined to suit the amount of heat needed to be supplied by the panel in a given application. For instance in a driveway for snow melting the total resistance of the heating element is lower than for indoor heating. The wire is first formed into the sinusoidal shape so as to have a continuous "tape" in the aforesaid wave shape. This continuous wave shape wire is then cut to the required length and is strung back and forth, namely the wire is turned upon itself repeatedly into parallel branches substantially of the length of the panel area, so that when the entire length of the wire is strung back and forth it will also cover the entire width of the panel area.

Figure 5:
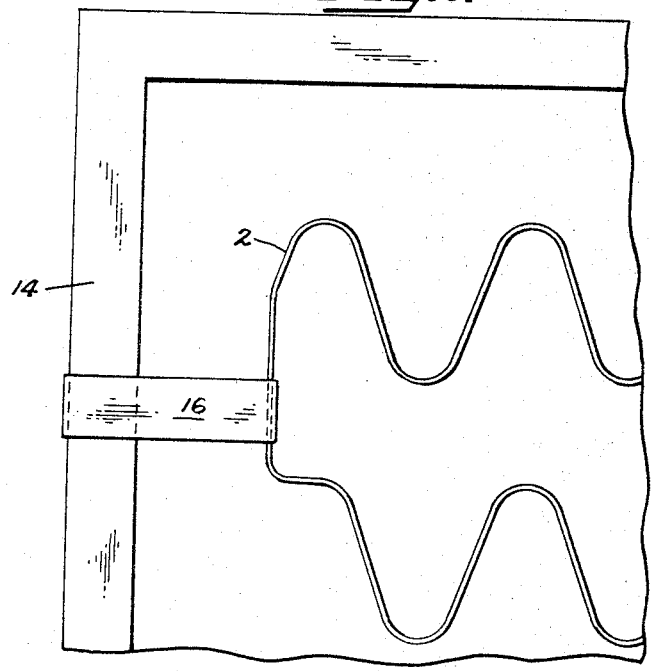
FIG. 5 is a fragmental view of the mounting of the heating wire on the temporary frame.
Figure 6:
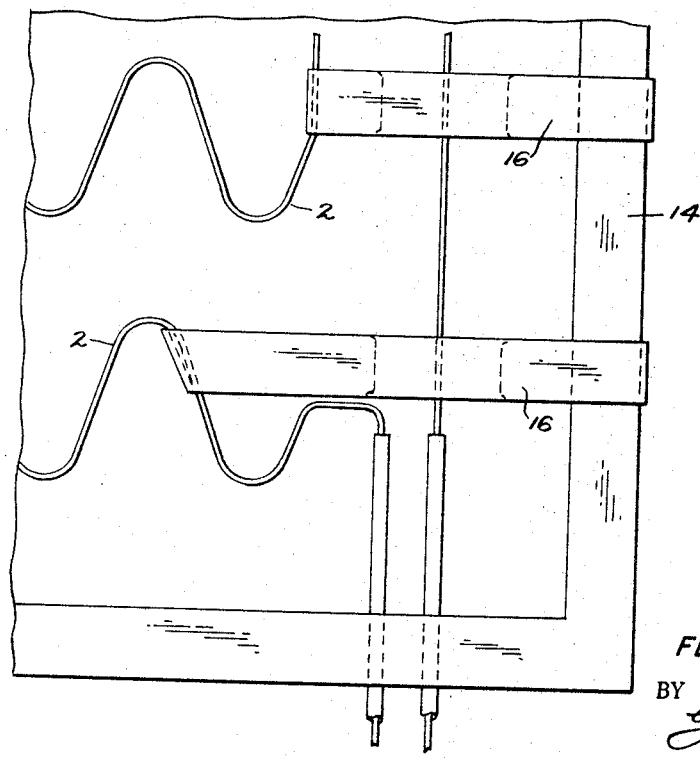
FIG. 6 is a fragmental view of the mounting of the heating wire near its terminal wires on the temporary frame.

The wire so formed is held in a metal frame as shown in FIGS. 4, 5 and 6 by suitable polyester tapes 16. Such polyester tape is placed around the metal frame 14 at each turn of the wire as shown in FIG. 5 and then it is placed around the wire and heat sealed as it is turned upon itself so as to hold the strung wire in place in the metal frame 14. Similarly long strips 17 of such polyester tape are sealed to the metal frame 14 transversely in spaced relation as shown in FIG. 4 and also doubled and sealed over the branches of the wire 2 to further assist in holding the strung wire in the metal frame.

In the illustrative embodiment herein there is provided a mold 18 which has sides 19 corresponding to the thickness of the finished laminate panel 1. When projections 7 are needed for the wearing surface then the bottom of the mold is provided with suitable mold cavities 21 to form the abrasive non-skid projections on the wearing surface.

A suitable polyester gel coat 22 is provided to fill the mold cavities 21. This polyester gel coat is of a special formulation for wear and strength and weathering, such as for instance a calcium carbonate filler or other hardening agent introduced in the resin. Then a second polyester gel coat 23 is applied by spraying it to completely cover the whole surface of the mold with weather resistant surface of comparative thinness.

Then a layer of fiberglass is laid on to the mold 18. At present two to four plies glass mat of suitable weight is used. Then the heating wire 2 in the metal frame 14 is placed over the mold. The area defined by the inside perimeter of the metal frame 14 is such that the metal frame 14 fits over the outside of the mold flanges 19, thus holding the strung wire 2 within the area defined between flanges 19 of the mold.

Then at least another layer of fiberglass is placed upon the conductor wire 2. Then suitable polyester resin is poured into the mold and over the fiberglass layers. Then the top mold plate 24 is lowered in the usual manner by hydraulic pressure or the like so as to compress the laminates in the mold 18.

The mold parts 18 and 24 are kept at a constant temperature in any suitable manner, for instance by hot oil passing through cavities in the respective molds to keep them, in the present instance, at about 220° F. temperature. As the mold plate 24 is lowered it coacts with the edges of the flanges 19 to cut the tapes 16 and 17 respectively. After ten minutes the laminates, as well as the tapes 16 and 17 are cured into an integral unit into a panel in the shape of the mold with the heating wire integrated therein. The terminals 3 of said wire project through one corner of the panel.

The final laminate so cured is lifted out of the press and the leads 13 are conected to the wire ends 3. These terminals 3 are connected to their leads 13 in an integral junction such as the epoxy potted junction 12 shown in FIG. 8.

As shown in FIG. 1, when more than one panel is used right and left arrangements for the leads 13 may be used on the panels so that one junction box 4 can feed two panels. Other types of junctions could be utilized to connect the electric wires of the respective panels to sources of electricity either directly or in series or in parallel with other panels.

The fiberglass layers integrated around the heating element function to protect the elements against mechanical breakage or electrical short circuits. The fiberglass layers are also non-conductors of electricity and insulate the heating element from the outside to positively prevent electric shocks to persons in contact with the panels. The panel is also fire-resistant and self-extinguishing because of the addition to the resin of suitable quantity of chlorowax and antimony trioxide. The resin used is also of high temperature distortion resin with distortion point of over 300° F.

I claim:
1. In a method of making electrically heatable panels, the steps of
 (a) providing a mold for the panel
 (b) applying a strong and weather resistant gel coat containing a hardening agent to the surface of the mold corresponding to the wearing surface of the panel
 (c) laying a layer of fiberglass in said mold
 (d) placing and holding a conductor wire, strung back and forth over the panel area, on said fiberglass layer
 (e) laying at least another fiberglass layer on said conductor wire
 (f) applying polyester resin to all fiberglass layers in sufficient quantity to cause the encapsulated product to acquire the shape of the mold
 (g) and curing said resinated fiberglass layers in said mold around said wire into an integral panel.

2. In a method of making electrically heatable panels, the steps of
 (a) stringing a conductor wire back and forth in a frame generally corresponding to the shape of the panel
 (b) applying fusible polyester tape to hold said wire in said strung shape on said frame
 (c) applying a layer of wear resisting and weather resisting coating substance to a surface of a mold corresponding to the exposed face of the panel
 (d) laying a layer of fiberglass in said mold
 (e) placing said wire strung on said frame on said fiberglass layer
 (f) laying at least another layer of fiberglass on said strung wire
 (g) applying resin to all fiberglass layers in the mold in sufficient quantity to cause the encapsulated product to acquire the shape of the mold
 (h) curing said layers in said mold until integrally united together around said wire into a panel.

3. The steps defined in claim 2 wherein the mold surface to which said layer of coating is applied is formed with wear surface designs and said coating fills all designs of said surface.

4. The steps of the method defined in claim 3, wherein said wear surface designs consist of grid cavities shaped to result in a non-skid surface.

5. In a method of making electrically heatable panels, the steps of (a) forming a resistance wire conductor in continuous sinuosoidal shape
(b) stringing said wire conductor back and forth in a frame to cover an area generally corresponding to the area of the panel, said frame being larger than the outline of the panel
(c) applying fusible tape to said frame and to said wire conductor to hold the latter in said strung shape on said frame and spaced from the sides of said frame
(d) providing a mold substantially corresponding to the shape and size of said panel
(e) placing a layer of fiberglass on said mold
(f) placing said frame over said mold so that said frame is outside of said mold and said strung wire conductor is within the area of the mold
(g) placing at least another layer of fiberglass on said strung wire conductor
(h) applying thermosetting resin to said fiberglass layers in sufficient quantity to cause the encapsulated product to acquire the shape of the mold
(i) closing said mold so as to sever said fusible tape from said frame
(j) curing said layers in said mold until integrally united together around said wire conductor into a panel.

References Cited

UNITED STATES PATENTS

| | | | |
|---|---|---|---|
| 2,522,841 | 9/1950 | Ross | 219—345 |
| 2,719,907 | 10/1955 | Combs | 219—544 X |
| 2,741,692 | 4/1956 | Luke | 219—46 |
| 2,750,321 | 6/1956 | Koppelman | 156—281 X |
| 2,862,097 | 11/1958 | Negromanti | 219—46 |
| 2,942,330 | 6/1960 | Luke | 29—155.5 |
| 2,990,607 | 7/1961 | Negromanti | 29—155.5 |
| 3,031,739 | 5/1962 | Boggs | 29—155.63 |
| 3,237,173 | 2/1966 | Chamberlain | 219—345 |

WILLIAM I. BROOKS, *Primary Examiner.*

RICHARD M. WOOD, *Examiner.*

V. Y. MAYEWSKY, *Assistant Examiner.*